United States Patent
Fletcher et al.

[15] 3,702,972
[45] Nov. 14, 1972

[54] ATOMIC HYDROGEN MASER WITH BULB TEMPERATURE CONTROL TO REMOVE WALL SHIFT IN MASER OUTPUT FREQUENCY

[72] Inventors: James C. Fletcher Administrator of the National Aeronautics and Space Administration with respect to an invention of; Robert F. C. Vessot, 334 Ocean Avenue, Marblehead; Martin W. Levine, Big Rock Road, Manchester, both of Mass.

[22] Filed: Sept. 23, 1971

[21] Appl. No.: 182,978

[52] U.S. Cl. ............................. 331/94, 324/.5 R
[51] Int. Cl. ................................. H01s 1/00
[58] Field of Search ............... 331/94; 324/.5 R

[56] References Cited

OTHER PUBLICATIONS

Applied Physics Letters, Vessot et al., Vol. 4, No. 7, pgs. 122–123, Apr. 1, 1964.

*Primary Examiner*—John Kominski
*Attorney*—John R. Manning et al.

[57] ABSTRACT

An atomic hydrogen maser is disclosed having automatic control of bulb temperature so as to eliminate the frequency shift due to collision of atomic hydrogen with the storage bulb walls. The storage bulb volume is changed by using a flexible bulb and the frequency of the output from the maser is measured for at least two different surface-to-volume configurations. The temperature of the bulb is maintained so that the output frequency is independent of the surface-to-volume ratio of the bulb and hence independent of atomic collision rate. The control process is done automatically by measuring the maser's output frequency over each half of a cycle where the bulb configuration is made to vary from minimum volume to maximum volume. An output frequency difference signal, measured during each cycle is used to control the bulb temperature, so that when the proper temperature is attained, a zero difference in frequency between operation at minimum volume and maximum volume is obtained.

10 Claims, 4 Drawing Figures

ROBERT F. C. VESSOT
MARTIN W. LEVINE
INVENTORS

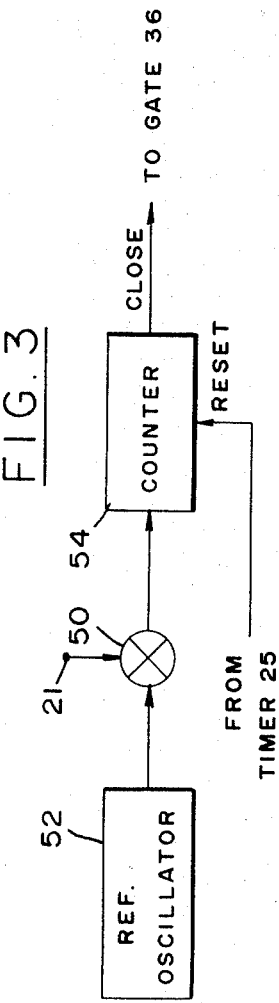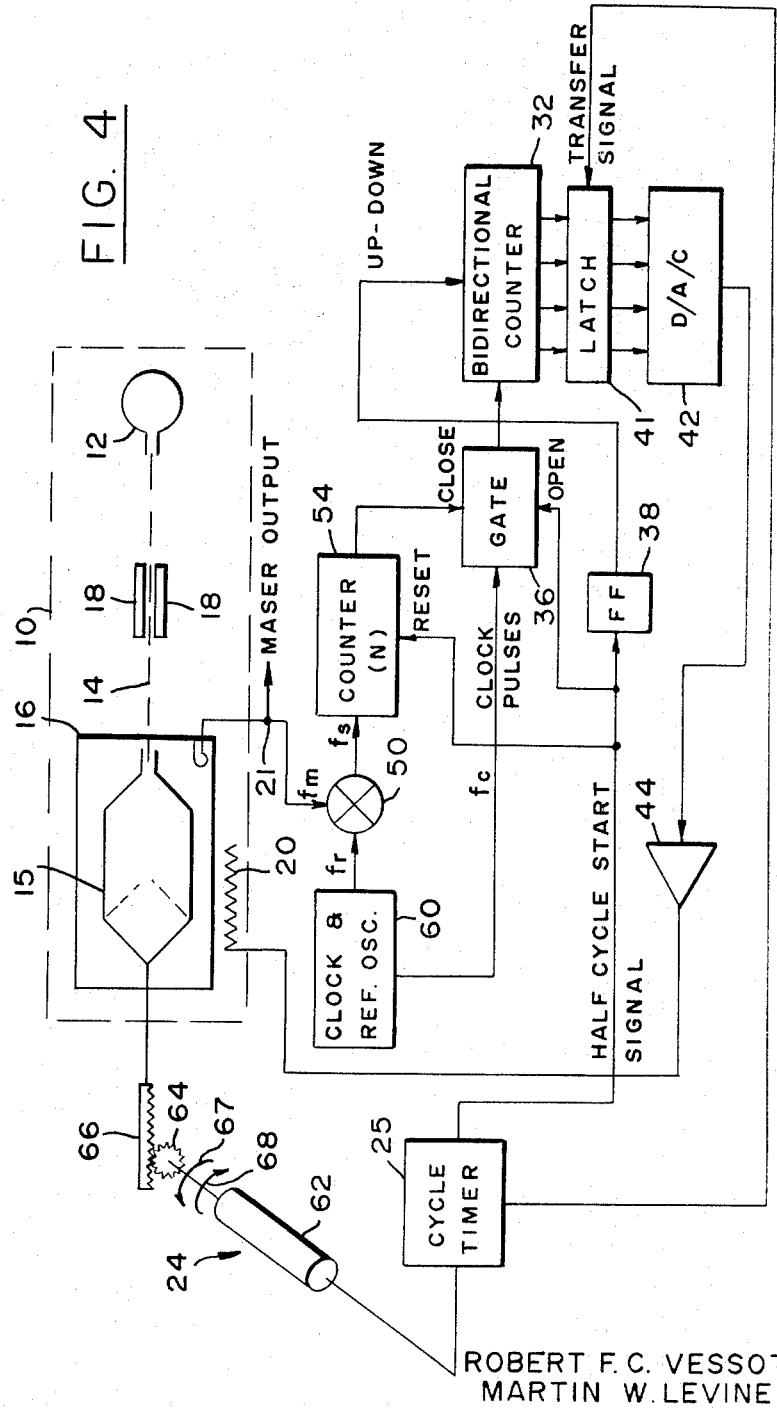

ATOMIC HYDROGEN MASER WITH BULB TEMPERATURE CONTROL TO REMOVE WALL SHIFT IN MASER OUTPUT FREQUENCY

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to masers and, more particularly, to improvements in an atomic hydrogen maser.

2. Description of the Prior Art

Atomic hydrogen masers have been developed to serve as very accurate frequency sources and standards. As is appreciated by those familiar with the art, a hydrogen maser includes a storage bulb. To date one of the most vexing problems affecting the accuracy of the output frequency of the atomic hydrogen maser is the shift in frequency due to collisions of the hydrogen atoms with the storage bulb walls, often referred to as wall shift. The wall shift of the maser depends on the collision rate and the average phase shift per collision of the atoms in the storage bulb. It has been discovered that for some bulb wall coating materials, such as polytetrafluoroethylene homopolymer (PTFE) and for tetrafluoroethylene-hexafluoro-propylene co-polymer (FEP), there exists a temperature at which the wall shift is zero, and that this zero wall shift point is independent of the collision rate of the atoms in the bulb. Thus if the bulb cam be maintained at such a temperature, the wall shift can be maintained at zero, thereby eliminating the uncertainty in output frequency due to the wall shift and improving the accuracy of the maser as a frequency standard. Although various techniques have been employed to control bulb temperature, to date, none have been found to be satisfactory.

OBJECTS AND SUMMARY OF THE INVENTION

It is a primary object of the present invention to provide a new improved atomic hydrogen maser.

Another object is to provide improvements in an atomic hydrogen maser.

A further object is to provide an atomic hydrogen maser with a bulb temperature control arrangement.

Still a further object of the present invention is to provide a novel arrangement for controlling the temperature of the storage bulb of an atomic hydrogen maser to improve the accuracy of the output frequency.

These and other objects of the invention are achieved by employing a flexible storage bulb, whose surface to volume ratio is changed during each measurement cycle. During each cycle the maser's output frequency is used in a novel arrangement to control the bulb's temperature so that the output frequency remains constant even though the bulb's surface-to-volume ratio is varied.

The novel features of the invention are set forth with particularity in the appended claims. The invention will best be understood from the following description when read in conjunction with the accompanying drawings.

BRIEF DESCRIPTION OF THE DRAWINGS

FIG. 3 is a block diagram of a converter 40, shown in FIG. 2; and

FIG. 4 is a complete diagram of an embodiment of the present invention.

DESCRIPTION OF THE PREFERRED EMBODIMENTS

Figure 1:
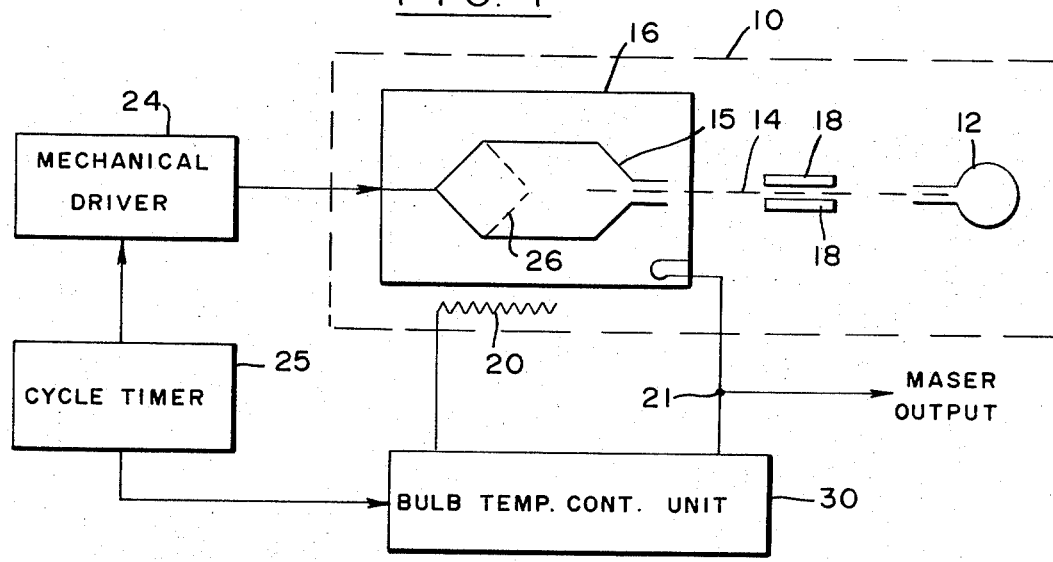
FIG. 1 is a general block diagram of an atomic hydrogen maser incorporating the teachings of the present invention.

Attention is directed to FIG. 1 wherein numeral 10 designates an atomic hydrogen maser, shown including a source of hydrogen atoms 12. Atoms, represented by dashed line 14 are state selected and focused into a storage bulb 15 in the maser's cavity 16 by passing through an inhomogeneous magnetic field, represented by magnets 18. Numeral 20 designates the bulb temperature controller, hereafter simply referred to as the bulb heater, while numeral 21 represents the maser's output terminal which is connected to the cavity 16 and at which the output frequency is present.

In accordance with the present invention, the bulb 15 is flexible rather than rigid. Attached to the bulb is a mechanical driver 24 which is controlled by a cycle timer 25. The latter activates driver 24 to vary the bulb volume from a maximum value, as shown in FIG. 1 by the solid lines to a minimum value, as represented by phantom lines 26, during each measurement cycle. In practice, during one half of each measurement cycle, the bulb volume has one value, e.g., maximum, and during the other cycle half its volume has the other value, e.g., minimum.

The timer 25 and output terminal 21 are also connected to a bulb temperature control unit 30. Briefly, the function of the latter is to control the bulb temperature by controlling the temperature of bulb heater 20 so that the difference between the output frequencies of the maser during the two half cycles of each measurement cycle is zero or a minimum. When this condition is reached, the output frequency is stabilized and is independent of the changes of the bulb's surface-to-volume ratio which can occur due to the change's in the bulb's volume, produced by driver 24. Under this condition the shift in frequency due to the atomic hydrogen collisions with the bulb's internal surface is zero.

In operation the unit 30 counts pulses provided at a preselected frequency during each half cycle. The period or time during which the pulses are counted depends on the output frequency of the maser during the particular half cycle. The difference of the two counts accumulated during the two cycle halves is used to control the bulb heater temperature in a direction (up or down) to minimize the difference between the two counts.

Figure 2:
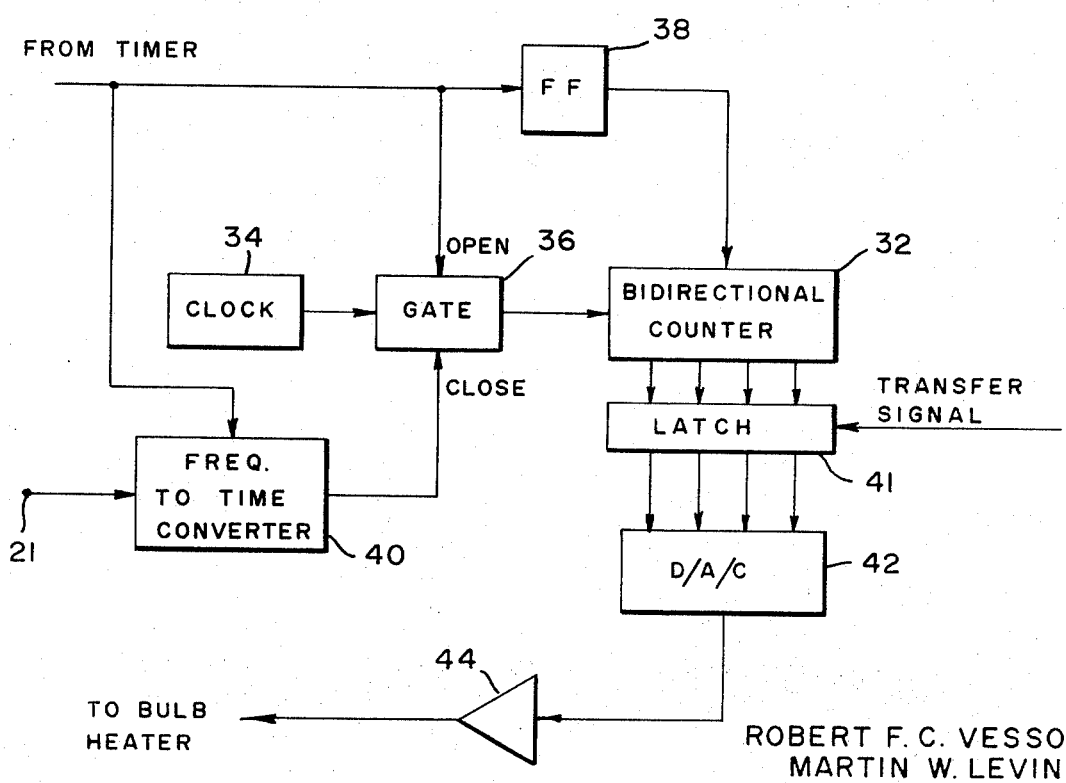
FIG. 2 is a block diagram of a unit 30 shown in FIG. 1.

One embodiment, capable of such a mode of operation, is diagrammed in FIG. 2 to which reference is now made. In the particular embodiment unit 30 is shown to include a bidirectional (up-down) counter 32 which counts clock pulses supplied thereto from a clock 34 through a gate 36. The direction of counting, i.e., whether up or down, depends on the state of a flip-flop 38. At the beginning of each half cycle, timer 25 provides a pulse to FF38 causing it to flip to the state opposite its previous state. For example, if the flip-flop was previously set, it is reset, and if previously it was reset, it is driven to its set state. When the flip-flop is set, the counter 32 counts in one direction, e.g., up, and when reset, it counts in the other direction, e.g., down. Thus, during the first half of each measurement cycle, the counter counts in one direction while during the second half, it counts in the opposite direction. Also, at the start of each half cycle the timer 25 supplies a pulse to gate 36 which opens the gate to enable the clock pulses from clock 34 to reach and be counted in counter 32.

The unit 30 also includes a frequency to time converter 40 which is supplied with the maser's output frequency at terminal 21 and which is reset by timer 25 at the start of each half cycle to provide a start time reference. The function of the converter 40, one embodiment of which is diagrammed in FIG. 3, is to supply a pulse to gate 36 which closes the gate at a time or period after the start time reference which is a function of the maser's output frequency. Thus, the number of clock pulses counted by counter 32 during each half cycle depends on the interval between the start time reference and the instant the gate closing pulse is supplied by the converter. This interval depends on the maser's output frequency. Consequently the count, accumulated in counter 32 during each half cycle, depends on the maser's output frequency during the particular half cycle.

The counter 32 is shown connected to a set of digital latches labeled LATCH, designated by numeral 41. The latch 41, which in practice may be a multistage register, is enabled by a transfer signal from timer 25, which is supplied just before the cycle end. When enabled, the content of counter 32 is transferred to the latch. This count does not change until a subsequent transfer signal is received. Thus, whereas during each cycle the count in counter 32 changes, the content in the latch is the final count in the counter present at the end of a preceding cycle. The output of latch 41 is supplied to a digital-to-analog converter (DAC) 42 whose output, which is amplified by amplifier 44, is directly related to the count in the latch. It is the output of amplifier 44 which is used to control the temperature of bulb heater 20. The counter 32 is not reset to zero during operation, so that the system is a true integrating servo.

The operation of the unit 40 may best be summarized with specific examples. Let it be assumed that during the first half cycle, the maser's output frequency is less than the frequency during the second half cycle and that the counter 32 counts up (positive) during the first half cycle and down (negative) during the second half cycle. Let it further be assumed that the time interval, defined by converter 40, is inversely proportional to the maser's output frequency, i.e., the interval is longer, the lower the maser output frequency. Consequently in the present example the positive count, accumulated during the first half cycle, is greater than the negative count during the second half cycle. Thus, at the end of the cycle a net positive count is present in counter 32. When this count is converted into a voltage by DAC 42, a positive output voltage is produced whose amplitude depends on the difference of the counts accumulated during the two half cycles. Consequently, the amplifier 44 causes heater 25 to vary the bulb temperature in one direction, e.g., raise the temperature.

However, if the output frequency during the first half cycle is greater than the frequency during the second half cycle, the net count at the end of the cycle is a negative number. Thus, the output voltage of the DAC 42 is of a negative polarity and consequently the amplifier 44 controls the heater 20 to vary bulb temperature in the opposite direction, e.g., lower the temperature. Clearly, if the frequency during each of the two half cycles is the same, the net count at the cycle end does not change. Thus the output of the DAC 42 does not change and therefore the bulb's temperature is not changed.

FIG. 3 represents one embodiment of converter 40. It includes a mixer 50 which mixes the maser output frequency at terminal 21 with the output frequency from a reference oscillator 52. Mixer 50 provides pulses or signals at a frequency $$f_s = f_m - f_r, \quad (1)$$

where $f_m$ and $f_r$ represent the maser's output frequency and the reference oscillator output frequency, respectively. The output signals of mixer 50 at $f_s$ are supplied to a counter 54, capable of accumulating a maximum count N. Counter 54 is reset by timer 25 at the start of each half cycle and when its count reaches its maximum value, i.e., N, for the first time during each half cycle it provides the gate closing pulse to gate 36.

It should thus be apparent that since gate 36 and counter 54 are opened and reset respectively, at the start of each half cycle. The interval during which gate 36 is open depends on the time required for counter 54 to count N pulses supplied thereto at a frequency $f_s$. This time period can be defined as $$T = f_s \cdot N = (f_m - f_r)N. \quad (2)$$

The count accumulated during each half cycle is therefore $$X = f_c \cdot T = f_c \cdot N(f_m - f_r), \quad (3)$$

where $f_c$ is the clock pulse frequency.

Clock 34 and oscillator 52 need be stable only over a complete cycle, so that $f_c$ and $f_r$ can be assumed to be constant during each measurement cycle. Since N is a constant, representing the maximum count of counter 54, it is apparent that the count X, accumulated during each half cycle in counter 32, depends only on $f_m$.

FIG. 4 to which reference is made is a complete block diagram of the particular embodiment, hereinbefore described, with elements like those previously described being designated by like numerals. Therein, the clock 34 (FIG. 2) and the reference oscillator 52 (FIG. 3) are represented by a single block 60 labeled clock and reference oscillator. Also therein one example of the mechanical driver 24, needed to vary the volume of the bulb 15, is diagrammed.

The driver is shown comprising a reversible motor 62 whose shaft is connected to a pinion 64 meshed to a rack 66, which has one end connected to the bulb 15.

In accordance with the present invention at the start of successive half cycles of each measurement cycle, opposite polarity signals are applied to the motor 62 causing it to rotate in opposite directions to impart, via pinion 64, linear motion to rack 66 and thereby vary the bulb's volume between maximum and minimum values. For explanatory purposes, it can be assumed that at the start of the first half cycle the motor turns counter-clockwise, as represented by arrow 67, thereby pulling rack 66 away from the cavity 16, which extends the bulb's volume to its maximum. The bulb remains at this shape until the start of the next half cycle when the motor rotates in the opposite direction, as represented by arrow 68. Thus rack 66 moves toward the cavity, thereby reducing bulb volume to a minimum.

Summarizing the foregoing description, in accordance with the teachings of the present invention, an atomic hydrogen maser is provided with a flexible storage bulb and with an arrangement for controlling bulb temperature as a function of the maser's output frequency during each of two halves of each measurement cycle. During one half of each cycle the bulb is extended to have a first (maximum) volume and during the other half cycle, the bulb is contracted to have a second (minimum) volume. The output frequencies of the maser during the two cycle halves are used to control the bulb's temperature to reach a value so that the output frequency is the same during each of the two cycle halves even though the bulb's volume and therefore its surface-to-volume ratio varies from one half cycle to the other.

Although particular embodiments of the invention have been described and illustrated herein, it is recognized that modifications and variations may readily occur to those skilled in the art without departing from the true spirit of the invention. Consequently it is intended that all modifications and equivalents to the particular embodiments are covered by the appended claims.

What is claimed is:

1. In an atomic hydrogen maser of the type including a storage bulb, the maser providing signals at a frequency which is a function of bulb temperature, an arrangement comprising:
   bulb volume control means for controlling the bulb volume to vary between first and second values; and
   control means for controlling the bulb temperature as a function of the difference between the frequencies of the signals provided by said maser when the bulb volume is of said first and second values.

2. The arrangement as recited in claim 1 wherein said arrangement includes timing means for defining a succession of measurement cycles each cycle having first and second halves, and means connecting said timing means to said bulb volume control means to control the latter to maintain the bulb volume to be of said first value during the first half of each cycle, and of said second value during the second half of each cycle.

3. The arrangement as recited in claim 2 further including means for connecting said timing means to said control means to control the bulb temperature during each cycle as a function of the difference between the frequencies of the output signals of said maser during the first and second halves of at least the preceding cycle in said succession.

4. The arrangement as recited in claim 2 wherein said control means include means for providing at the end of each cycle a final count which is a function of first and second counts accumulated during the first and second halves of each cycle respectively, the first and second counts being functions of the frequencies of the maser's output signals during said first and second halves of each cycle, respectively.

5. The arrangement as recited in claim 1 wherein said control means include means for providing signals at a reference frequency and means for providing signals at a first beat frequency which is a function of the difference between said reference frequency and the frequency of the signals from said maser when the bulb volume is of said first value, and for providing signals at a second beat frequency which is a function of the difference between said reference frequency and the frequency of the signals from said maser when the bulb volume is of said second value, and means for controlling the bulb temperature as a function of the frequency difference between said first and second beat frequencies.

6. In an atomic hydrogen maser of the type including a storage bulb, the maser providing signals at a frequency which is a function of bulb temperature, an arrangement comprising:
   timing means for defining a sequence of measurement periods and for providing enabling signals at the start of the first half of each period and at the start of the second half of each period;
   first means coupled to said flexible bulb and responsive to said enabling signals for extending said bulb to a first volume in response to the enabling signal at the start of the first half of each period, and for extending said bulb to a second volume, different from said first volume, in response to the enabling signal at the start of the second half of each period;
   a source of signals at a reference frequency;
   second means responsive to the signals at said reference frequency and the signals from said maser for providing signals at a beat frequency which is a function of the difference between said reference frequency and the frequency of the signals from said maser;
   third means for providing a first count which is a function of the time during which said second means provide a preselected number of said signals in the first half of each measurement period, and for providing a second count which is a function of the time during which said second means provide said preselected number of said signals in the second half of each measurement period; and
   control means for controlling the temperature of said bulb as a function of the difference between said first and second counts.

7. The arrangement as recited in claim 6 wherein said control means includes means for accumulating the difference between the first and second counts provided during a succession of said periods.

8. In a maser of the type including a cavity containing a storage bulb, said maser providing maser output signals at a frequency which is a function of bulb temperature, an arrangement comprising:

timing means for defining a succession of measurement cycles and for providing first and second signals at the start of the first and second halves of each measurement cycle;

drive means responsive to said first and second signals for controlling said bulb to have a first volume value during the first half of each measurement cycle and to have a second volume value during the second half of each measurement cycle;

a source of reference signals at a reference frequency which is stable over at least one measurement cycle;

mixing means for mixing the reference signals with the maser output signals for providing a succession of control pulses at a frequency which is a function of the difference between the frequency of the maser output signals and said reference frequency;

a source of clock pulses;

bidirectional counter for counting said clock pulses supplied thereto;

control means for controlling said bidirectional counter to count in a first direction the clock pulses supplied thereto during a first time interval in the first half of each cycle, said first time interval being a function of the frequency of said control pulses and a preselected number of said control pulses, said control means further control said counter to count in a second direction opposite said first direction the clock pulses supplied thereto during a second time interval in the second half of each cycle, said second time interval being a function of the frequency of said control pulses and said preselected number of said control pulses; and output means responsive to the final count in said counter at the end of each cycle for controlling the temperature of said bulb.

9. The method of controlling the temperature of a storage bulb in an atomic hydrogen maser to stabilize the frequency of the maser's output signals, the steps comprising:

generating a sequence of measurement cycles, each having a first half and a second half;

varying the bulb volume to be of a first value during the first half of each cycle and of a second value during the second half of each cycle; and controlling the bulb temperature as a function of the frequencies of the maser's output signals during the first and second halves of said cycles.

10. The method as recited in claim 9 wherein the step of controlling includes the steps of:

generating first and second time intervals during the first and second halves of each cycle respectively;

accumulating a count which is a function of the difference of said first and second time intervals; and controlling said bulb temperature as a function of the accumulated count.

* * * * *